US009446960B2

(12) United States Patent
Luyken et al.

(10) Patent No.: US 9,446,960 B2
(45) Date of Patent: Sep. 20, 2016

(54) PROCESS FOR ION EXCHANGE ON ZEOLITES

(71) Applicant: BASF SE, Ludwigshafen (DE)

(72) Inventors: Hermann Luyken, Ludwigshafen (DE); William Todd Owens, Tallahassee, FL (US)

(73) Assignee: BASF SE, Ludwigshafen (DE)

( * ) Notice: Subject to any disclaimer, the term of this patent is extended or adjusted under 35 U.S.C. 154(b) by 401 days.

(21) Appl. No.: 13/679,054

(22) Filed: Nov. 16, 2012

(65) Prior Publication Data

US 2013/0129613 A1 May 23, 2013

Related U.S. Application Data

(60) Provisional application No. 61/561,294, filed on Nov. 18, 2011.

(51) Int. Cl.
*C01B 39/02* (2006.01)
*B01J 37/06* (2006.01)
*B01J 29/08* (2006.01)
*B01J 29/18* (2006.01)
*B01J 29/40* (2006.01)
*B01J 29/50* (2006.01)
*B01J 29/60* (2006.01)
*B01J 29/70* (2006.01)
*B01J 37/00* (2006.01)
*C10G 11/05* (2006.01)
*B01J 29/06* (2006.01)

(52) U.S. Cl.
CPC ............ *C01B 39/026* (2013.01); *B01J 29/061* (2013.01); *B01J 29/087* (2013.01); *B01J 29/088* (2013.01); *B01J 29/185* (2013.01); *B01J 29/405* (2013.01); *B01J 29/505* (2013.01); *B01J 29/605* (2013.01); *B01J 29/7053* (2013.01); *B01J 29/7065* (2013.01); *B01J 37/0009* (2013.01); *B01J 37/0036* (2013.01); *B01J 37/06* (2013.01); *C10G 11/05* (2013.01); *B01J 2229/186* (2013.01); *B01J 2229/38* (2013.01); *B01J 2229/42* (2013.01)

(58) Field of Classification Search
CPC ..... C10G 11/05; C01B 39/026; C01B 39/14; C01B 39/20; C01B 39/26; C01B 39/30; C01B 39/32; C01B 39/38; B01J 29/06; B01J 29/061; B01J 29/087; B01J 29/088; B01J 29/185; B01J 29/405; B01J 29/505; B01J 29/605; B01J 29/7053; B01J 29/7065; B01J 37/0009; B01J 37/0036; B01J 37/06; B01J 2229/186; B01J 2229/38; B01J 2229/42
See application file for complete search history.

(56) References Cited

U.S. PATENT DOCUMENTS

| | | | | |
|---|---|---|---|---|
| 3,640,680 A | * | 2/1972 | Kokotailo et al. | 423/716 |
| 3,687,839 A | * | 8/1972 | Jenkins | 585/752 |
| RE28,629 E | | 11/1975 | Maher et al. | |
| 3,923,639 A | * | 12/1975 | Ciric | 208/111.15 |
| 3,966,882 A | * | 6/1976 | Maher et al. | 423/713 |
| 4,346,067 A | * | 8/1982 | Wachter | 423/326 |
| 5,622,632 A | * | 4/1997 | Gallup | 210/669 |
| 5,916,836 A | * | 6/1999 | Toufar et al. | 502/86 |
| 2008/0045768 A1 | * | 2/2008 | Roth et al. | 585/899 |
| 2008/0118431 A1 | * | 5/2008 | Vermeiren et al. | 423/713 |
| 2008/0293561 A1 | * | 11/2008 | Long et al. | 502/65 |
| 2011/0190561 A1 | * | 8/2011 | Bulut et al. | 585/467 |

FOREIGN PATENT DOCUMENTS

| | | |
|---|---|---|
| CN | 1353086 | 6/2002 |
| CN | 1806908 | 7/2006 |
| CN | 101623650 | 1/2010 |
| CN | 10 1905168 | * 8/2010 |
| CN | 101905168 | * 12/2010 |
| CN | 102623650 | 8/2012 |
| WO | WO-2009/036145 | 3/2009 |
| WO | WO-2010/139997 | 12/2010 |

OTHER PUBLICATIONS

PCT International Search Report in PCT/IB2012/056205, dated Mar. 21, 2013, 3 pgs.
"Ullmann's Encyclopedia of Industrial Chemistry,", 6th edition, vol. 39, 2003, Wiley-VCH publishers, pp. 638 to 640.
Arpe, Hans-Jürgen, "Industrielle organische Chemie [Industrial Organic Chemistry],", 6th edition, 2007, Wiley-VCH publishers, pp. 64 to 65.
Hollemann-Wiberg, "Ammoniumcarbonat"—Lehrbuch der Anorganischen Chemie [Inorganic Chemistry], 102nd edition (2007), Walter de Gruyter publishers, p. 671.
Hollemann-Wiberg, "Lehrbuch der Anorganischen Chemie", 102nd edition (2007), Walter de Gruyter publishers, p. 1291.

* cited by examiner

*Primary Examiner* — David M Brunsman
(74) *Attorney, Agent, or Firm* — Oblon, McClelland, Maier & Neustadt, L.L.P.

(57) ABSTRACT

Aspects of the present invention relate to an improved process for exchanging sodium ions in zeolites comprising sodium ions and rare earth metal ions for ammonium ions. For this exchange, aqueous solutions of ammonium salts, for example ammonium sulfate, ammonium nitrate or ammonium chloride, are currently being used. The resulting "ammonium zeolites" are calcined to convert them, with release of ammonia, to the H form of the zeolites suitable as a catalyst. The use of ammonium carbonate also minimizes the amount of rare earth metal ions which are leached out of the zeolites comprising rare earth metal ions.

17 Claims, 1 Drawing Sheet

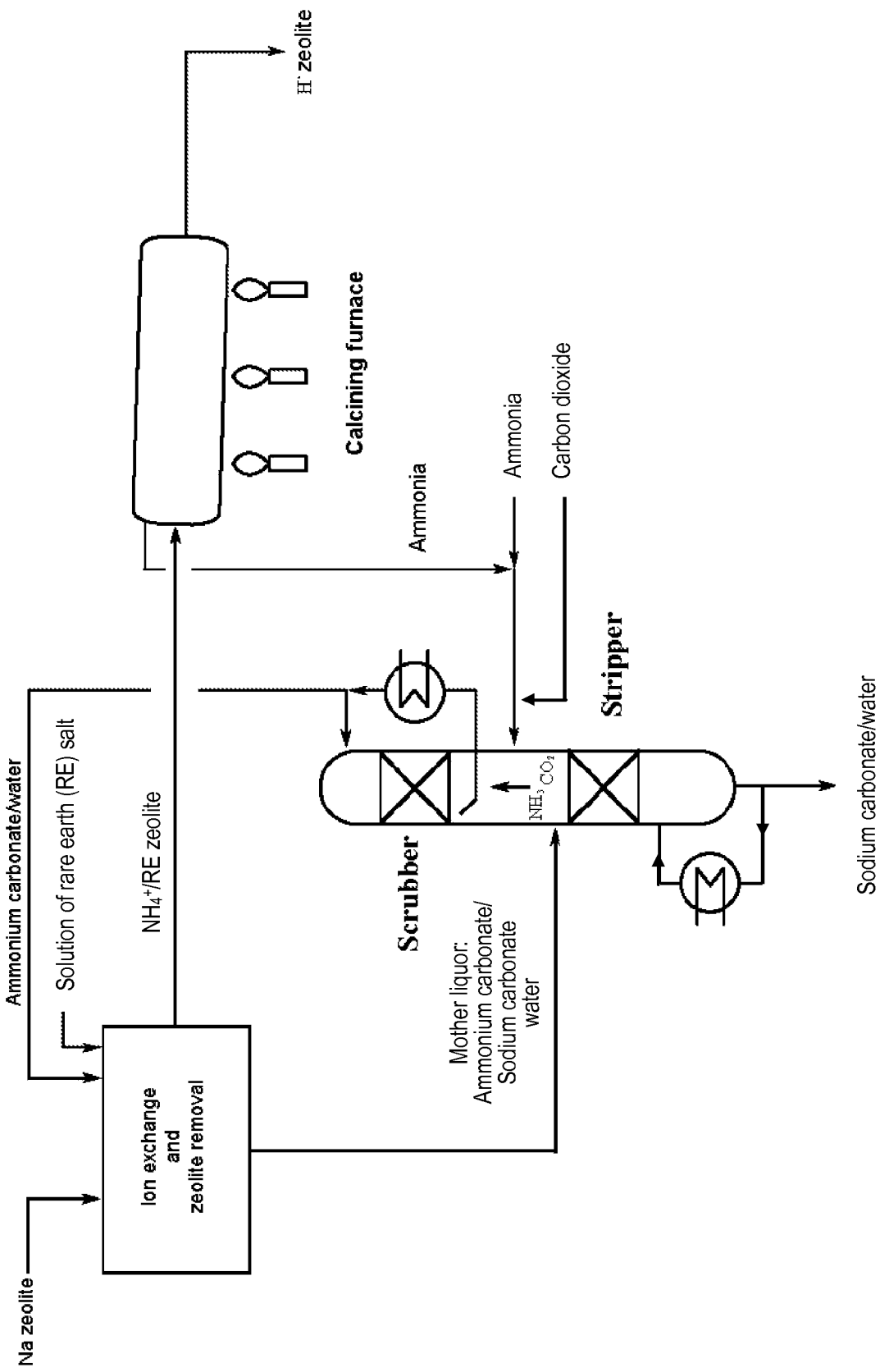

PROCESS FOR ION EXCHANGE ON ZEOLITES

CROSS-REFERENCE TO RELATED APPLICATIONS

This application claims priority to U.S. Provisional Application No. 61/561,294, filed Nov. 18, 2011, the entire contents of which is incorporated by reference in their entirety.

FIELD

The present invention relates to processes for exchanging sodium ions in zeolites comprising sodium ions and rare earth metal ions for ammonium ions.

BACKGROUND

The high demand in petrochemistry for lower hydrocarbons such as saturated and unsaturated aliphatic, cycloaliphatic or aromatic hydrocarbons is satisfied by conversion processes such as catalytic cracking, hydrocracking or thermal cracking. The feedstocks used are crude oils or relatively high-boiling crude oil distillate fractions.

In catalytic cracking, preference is given to working with fluidized beds consisting of zeolites (FCC processes). The zeolites are used in the H form, which can be produced by heating corresponding zeolites comprising ammonium ions and preferably cations of rare earth metals to about 400° C. (Hans-Jürgen Arpe, Industrielle organische Chemie [Industrial Organic Chemistry], 6th edition, 2007, Wiley-VCH publishers, pages 64 to 65).

For instance, U.S. Pat. No. 3,966,882 describes the exchange of Na for $NH_4$ ions Ammonium carbonate is not mentioned.

US Re28,629 and U.S. Pat. No. 4,346,067 disclose using ammonium chloride, ammonium nitrate or ammonium sulfate for ion exchange. In examples 1 to 3 and 8, for example, sodium ions present in Y zeolites are exchanged for ammonium ions using aqueous ammonium sulfate solutions. Example 6 describes the exchange of sodium ions in Y zeolites for rare earth metal cations. In example 7, the exchange of sodium ions in an X zeolite for rare earth cations and calcination are followed by an exchange of sodium ions for ammonium ions.

U.S. Pat. No. 4,346,067 also mentions that, apart from the ammonium compounds, urea may also be present. Tables I and II in example 1C show that, with aqueous urea in the absence of ammonium compounds, 9.18–8.17%=0.61% of the original amount of Na is still exchanged. This can be explained by hydrolysis of the urea to ammonium carbonate and subsequent ion exchange.

CN 101623650 mentions that ammonium carbonate is used for ion exchange.

The exchange between zeolite comprising sodium ions, for example a sodium Y zeolite, and an ammonium salt, for example ammonium nitrate, constitutes an equilibrium reaction. In order to exchange the sodium ions or rare earth metal cations very substantially for ammonium ions, the zeolite has to be treated several times in succession, preferably at temperatures of 70° C. to 100° C., in some cases to 200° C., with an excess of aqueous ammonium nitrate or rare earth metal salts relative to the sodium ions. After the ion exchange step, the salt solution is generally separated from the zeolite. The solid zeolite can subsequently be washed with water in order to remove salts. After each ion exchange step, it is calcined at 200° C. to 600° C. In the course of this, ammonia release from the ammonium ions forms the desired H form of the zeolite (Ullmann's Encyclopedia of Industrial Chemistry, 6th edition, volume 39, 2003, Wiley-VCH publishers, pages 638 to 640).

As a result of the ion exchange and the calcination, the Y zeolite in the H form, preferably comprising cations of the rare earth metals, and an aqueous salt solution comprising a mixture of sodium nitrate and unconverted ammonium nitrate are obtained. Since the replacement of the sodium ions by the ammonium ions and the cations of the rare earth metals is incomplete, ammonium compounds and salts of the rare earth metals are present alongside sodium compounds in the mother liquor.

The thermal release of ammonia and carbon dioxide from an aqueous ammonium carbonate solution is described in WO 2009/036145. For instance, FIG. 1 shows that ammonia and water are first released from ammonium hydrogencarbonate/sodium carbonate mixtures and the remaining sodium hydrogencarbonate is converted to sodium carbonate with release of carbon dioxide.

Hollemann-Wiberg, Lehrbuch der Anorganischen Chemie [Inorganic Chemistry], 102 nd edition (2007), Walter de Gruyter publishers, page 671, "Ammoniumcarbonat" section, it is known that ammonium carbonate can be produced by introducing carbon dioxide into aqueous ammonia.

One disadvantage in the prior art processes is that large amounts of aqueous sodium nitrate and ammonium nitrate solution, sodium sulfate and ammonium sulfate solution or sodium chloride and ammonium chloride solution are formed, which are obtained, for example, in the case of use of ammonium nitrate, ammonium sulfate or ammonium chloride in the ion exchange of zeolites comprising sodium ions.

A further disadvantage is that not inconsiderable amounts of salts of the rare earth metals are leached out of the zeolites.

The salt solutions can in principle be used for production of fertilizers. However, this means only a low level of added value. Moreover, the economic viability of utilization as a fertilizer depends on the site.

The ammonia bound in the ammonium salts can be released by addition of at least equimolar amounts of sodium hydroxide solution, removed by stripping or distillation and reused for the preparation of the ammonium salts. However, this addition of value is reduced by the consumption of sodium hydroxide solution. There remains a large amount of the respective aqueous sodium salt solution. If there is no means of further use, it has to be disposed of. The known processes require high circulation rates with a considerable energy requirement, which constitutes an economic disadvantage.

The recovery of rare earth metals constitutes an additional, complex process step.

SUMMARY

One aspect of the invention relates to a method for exchanging sodium ions in zeolites comprising sodium ions and rare earth metal ions for ammonium ions, the method comprising treating the zeolite comprising sodium ions and rare earth metal ions with a solution comprising water and ammonium carbonate. In one or more embodiments, after treatment, the zeolite has a content of rare earth metal ions of 0.01 to 10% by weight (expressed as REO). In some embodiments, the content of rare earth metal ions is 0.1 to 8% by weight. In one or more embodiments, the content of rare earth metal ions is 0.5 to 5% by weight.

In some embodiments, the zeolite comprises ZSM-5 X, Y, A, L, faujasite, chabazite, erionite, mordenite, or offretite. In one or more embodiments, the solution comprising water and ammonium carbonate is prepared from water, ammonium carbonate and a further compound selected from the group consisting of urea, ammonium carbamate, mixtures of carbon dioxide and ammonia, and mixtures thereof. In some embodiments, the rare earth metal comprises an element selected from the group consisting of lanthanum, cerium, praseodymium and neodymium, and combinations thereof.

In one or more embodiments, the rare earth metal is present in the form of a salt. In some embodiments, the treatment of the zeolite takes place at a temperature of about 0° C. to about 200° C. In one or more embodiments, the temperature is about 50 to about 80° C. In one or more embodiments, wherein treating the zeolite comprises suspending the zeolite in the solution comprising water and ammonium carbonate and stirring the solution.

In some embodiments, treating the zeolite comprises arranging the zeolite in a fixed bed form and pumping or trickling the solution comprising water and ammonium carbonate over the zeolite. In one or more embodiments, treatment of the zeolite occurs for about 0.1 seconds to about 10 hours. In some embodiments, treatment of the zeolite occurs for about 1 second to about 1 hour.

In one or more embodiments, the method further comprises washing the zeolite after treating the zeolite with water, wherein the zeolite is washed with about 1 to about 1000 g water per gram of zeolite. In some embodiments, treating the zeolite provides a mother liquor comprising sodium compounds, ammonium compounds and salts of rare earth metals. In one or more embodiments, the method further comprises separating the zeolite from the mother liquor. In some embodiments, the mother liquor is combined with the solution comprising water and ammonium carbonate and the method is repeated. In one or more embodiments, the method further comprises calcining the zeolite after treatment to release ammonia.

BRIEF DESCRIPTION OF THE DRAWINGS

The FIGURE shows a process according to one or more embodiments of the invention.

DETAILED DESCRIPTION

One or more aspects of the present invention provides a process which does not have the abovementioned disadvantages.

More particularly, one or more aspects of the present invention recovers the ammonium present in the salt solution obtained in the ion exchange, and optionally additionally the corresponding counterion, to increase the economic viability.

Further aspects of the present invention provide a process in which a minimum level of rare earth metal ions is leached out of the zeolites comprising rare earth metal ions.

Accordingly, some aspects of the invention provide a process for exchanging sodium ions in zeolites comprising sodium ions and rare earth metal ions for ammonium ions, which comprises treating the zeolite comprising sodium ions and rare earth metal ions with a solution comprising water and ammonium carbonate.

In one or more embodiments, aqueous solutions of ammonium salts, for example ammonium sulfate, ammonium nitrate or ammonium chloride, are currently being used. The resulting "ammonium zeolites" are calcined to convert them, with release of ammonia, to the H form of the zeolites suitable as a catalyst.

In some embodiments of the invention, methods are provided that use ammonium carbonate instead of the ammonium compounds mentioned. Since excess ammonium carbonate, in contrast to the nitrates, sulfates or chlorides, can be recycled in the form of carbon dioxide and ammonia, the amount of salt which has to be discharged can be lowered significantly.

Ion Exchange

For the ion exchange, natural or synthetic crystalline zeolites which comprise alkali metal or alkaline earth metal ions are suitable.

Non-limiting examples include sodium, potassium, calcium and magnesium ions, or more specifically sodium ions.

All zeolites comprising alkali metal and alkaline earth metal ions are suitable in principle. Non-limiting examples include those of the ZSM type, especially ZSM-5, and also X, Y, A and L zeolites. Other options are naturally occurring zeolites such as faujasite, chabazite, erionite, mordenite, offretite (U.S. Pat. No. 4,346,067, column 1, lines 43 to 57). In specific embodiments, the zeolites comprise Y zeolites in the sodium form.

In order to obtain effective catalytic cracking catalysts, the alkali metal content of the zeolite should be lowered by ion exchange to less than 10% by weight, or less than 5% by weight, or less than 1% by weight.

The solution comprising water and ammonium carbonate may be prepared from water and ammonium carbonate and optionally further compounds.

In one or more embodiments, those compounds are used which give rise to ammonium carbonate under the reaction conditions of the ion exchange with water.

Among these further compounds, examples include urea, ammonium carbamate, mixtures of carbon dioxide and ammonia, and mixtures thereof. In a further embodiment of the invention, these further compounds may also be used instead of ammonium carbonate.

Ammonium carbonate is used for the ion exchange as an aqueous solution of strength 0.1% by weight up to the solubility limit, or 5 to 35% by weight or 10 to 25% by weight Ammonium carbonate is understood to mean $(NH_4)_2CO_3$, $NH_4HCO_3$ and mixtures thereof.

Instead of ammonium carbonate or in a mixture with ammonium carbonate, it is also possible to use, for the ion exchange, compounds which form ammonium carbonate in aqueous solution under the reaction conditions. Examples thereof are urea and ammonium carbamate.

It is also possible to dissolve carbon dioxide and ammonia, for instance in a molar ratio of 1 to 2, in water and react them with the suspended zeolite.

The reaction of, for example, urea and/or ammonium carbamate with water can be effected in a separate reaction step prior to the ion exchange. However, it is also possible to conduct the reaction of urea and/or ammonium carbonate and the ion exchange in the same process step.

Suitable salts of the rare earth metals (lanthanoids) are in principle all salts of the elements with atomic numbers 57 to 71 and salt mixtures of these elements. In one or more embodiments, water-soluble salts of the elements lanthanum, cerium, praseodymium and neodymium, and salt mixtures of these compounds are utilized. Particular preference is given to lanthanum.

These mixtures may also comprise salts of elements of atomic numbers 61 to 71 in amounts of less than 10%, or less than 5%, or less than 1% by weight.

In one or more embodiments, water-soluble salts of lanthanum which may comprise salts of elements of atomic numbers 58 to 71 in amounts of less than 10%, or less than 5% or less than 1% by weight are utilized.

Suitable salts of the rare earth metals are, for example, the nitrates, sulfates and chlorides, or more specifically nitrates or sulfates.

In a some embodiments, the process according to the invention is preceded by a process step in which the zeolite comprising sodium ions and rare earth metal ions is obtained by first treating a sodium zeolite with a solution comprising water and ammonium carbonate, in the course of which a majority of the sodium ions are exchanged for ammonium ions. In a subsequent step, a rare earth metal cation exchange may be performed.

In one or more embodiments of the present application, the invention may further encompass a process for exchanging sodium ions in zeolites comprising sodium ions for rare earth metal ions and ammonium ions, which comprises first treating the zeolite comprising sodium ions with a solution comprising water and ammonium carbonate, and in a subsequent step performing a rare earth metal cation exchange.

In some embodiments, the zeolite obtained by the process according to the invention has a content of rare earth metal ions of 0.01 to 10% by weight (expressed as REO), or 0.1 to 8% by weight (expressed as REO) or 0.5 to 5% by weight (expressed as REO).

REO may be determined by X-ray fluorescence (XRF) analysis. For this purpose, by way of example, the following procedure is employed: typically, 4 g of a zeolite sample are calcined at 1500° F. (815.56° C.) for 15 minutes and ground. The grinding can be effected, for example, by grinding for two minutes, then adding a binder such as SOMAR Microcellulose Binder and grinding for a further two minutes. Preferably, all particles after the grinding have a size of 44 µm or less. This can be checked if desired. Laser diffraction measurements, for example, are suitable for this purpose. A slug is produced from the ground material. This can be done by means of a hydraulic press. The slug is analyzed with a Panalytical XRF. This determines the contents of sodium and rare earth metal. For this purpose, it is necessary to calibrate the Panalytical XRF beforehand with the elements to be analyzed. In doing this, the matrix has to be taken into account. The calibrations are performed with standard samples with known contents of sodium and rare earth metals. The results can be read off directly from the instrument. The result for rare earth metals is expressed in REO, and the total content of the rare earth metals in the zeolite is reported in "% by weight (expressed as REO)".

The ion exchange with aqueous ammonium carbonate and the ion exchange with salts of the rare earth metals are performed at temperatures of 0° C. to 200° C., preferably 20° C. to 100° C., or 50° C. to 80° C., and total pressures of 1 to 300 bar, or 1 to 50 bar, or 1 to 10 bar.

The ion exchange can be effected batchwise or continuously.

The zeolite can be suspended in the aqueous stirred ammonium carbonate solution. However, it is also possible to arrange the zeolite in fixed bed form, for example in a tubular reactor, and to pump the aqueous ammonium carbonate solution over the zeolite in liquid phase or trickle mode and to conduct the ammonium carbonate solution in circulation or in straight pass.

In some embodiments, the zeolite and the ammonium carbonate solution can flow through a tube, particular preference being given to conducting the solution in countercurrent to the zeolite.

In one or more embodiments, the ion exchange is conducted in one or more belt filters. The mother liquor from the downstream filter can be recycled in countercurrent to the previous filter.

In some embodiments, the ion exchange is performed in a combination of one or more stirred tanks or one or more flow tubes and one or more belt filters in succession and in countercurrent.

The reaction time needed for the ion exchange is 0.1 second to 10 hours, or 1 second to 2 hours or 1 second to 1 hour.

Zeolite Removal and Calcination

Zeolite suspended in aqueous ammonium carbonate solution can be removed, for example, by filtration or centrifugation.

In order to remove salts adhering to the zeolite, it can be washed once or more than once, or one to three times, with water. In further embodiments, the amount of water utilized may be 1 to 1000 g of water per g of zeolite.

In some embodiments, the wash water can be combined with the salt solution removed from the zeolite.

The calcined zeolite can optionally be passed onward into a second ion exchange stage a).

The cycle sequence of ion exchange, zeolite removal and calcination is optionally repeated until the sodium content of the zeolite has fallen to the desired value. In general, 1 to 3 cycles and especially 1 to 2 cycles are needed for this purpose.

Thermal release of ammonia and carbon dioxide from the excess aqueous ammonium carbonate solution (mother liquor).

The excess ammonium carbonate solution which has been removed from the zeolite after the ion exchange additionally comprises sodium carbonate.

This solution can be combined with the wash water if the zeolite has been washed with water.

The mixture of ammonium carbonate solution and sodium carbonate solution and water is heated to a temperature above 50° C., preferably above 60° C. There is in principle no upper limit to the temperature, but temperatures above 100° C. may require an elevated pressure. The heating can be performed batchwise or continuously. Evaporation of a portion of the liquid results in escape of carbon dioxide and possibly ammonia.

In one or more variants, the mixture is supplied continuously to a distillation column. The liquid in the bottom of the column is heated and partly evaporated by introduction of heat or steam. Ammonium carbonate decomposes along the plates of the column, and carbon dioxide and ammonia formed are stripped out of the liquid by the ascending vapor. In the bottom, a solution depleted of ammonium carbonate is obtained. In further embodiments, the bottoms comprise barely any or no ammonium carbonate.

If desired, the thermal release may be effected with addition of a base. Examples of suitable bases are alkali metal hydroxide and/or alkaline earth metal hydroxide. These can be added in solid form or as a solution, or more particularly, as an aqueous solution.

In embodiments where a base is added as an aqueous solution, a concentration of 0.1% by weight to 50% by weight may be used. In further embodiments, a concentration of 10% by weight to 50% by weight is used.

One or more embodiments relates to an aqueous solution of sodium hydroxide (sodium hydroxide solution) with a concentration of 0.1% by weight to 50% by weight. In further embodiments, an aqueous solution of sodium hydroxide (sodium hydroxide solution) with a concentration of 10% by weight to 50% by weight is used.

Recycling of Ammonia and Carbon Dioxide

Carbon dioxide and ammonia, which are obtained as low boilers from the thermal treatment, can be recombined by cooling for recovery. They may be recombined in aqueous solution. One or more embodiments relates to recovery by condensation and cooling of the liquid stream, the liquid stream being used for absorption of gaseous carbon dioxide and ammonia.

The aqueous ammonium carbonate solution can be reused for the ion exchange.

However, it is also possible to introduce ammonia and carbon dioxide directly into the aqueous ammonium carbonate solution used for the ion exchange.

Discharge of Aqueous Sodium Carbonate Solution

The bottom product obtained from the thermal treatment is aqueous sodium carbonate solution, which is discharged from the process.

Sodium carbonate (soda) is one of the most important products in the large-scale chemical industry, which is optionally used instead of NaOH. Annual global production is on the 50 megatonne scale (Hollemann-Wiberg, Lehrbuch der Anorganischen Chemie, 102nd edition (2007), Walter de Gruyter publishers, page 1291)

Therefore, the options for utilization of aqueous sodium carbonate solution are much more favorable than those for aqueous ammonium nitrate/sodium nitrate, ammonium sulfate/sodium sulfate or ammonium chloride/sodium chloride solutions.

It is also advantageous that, in the case of use of ammonium carbonate rather than, for example, ammonium nitrate, the RE content of the zeolite is virtually unchanged. Therefore, relatively small amounts of rare earth metal salts are present in the mother liquors of the ion exchange. These amounts may be so small that a recovery of the rare earths becomes superfluous.

FIGURE shows an embodiment of the process according to the invention. The sodium zeolite is treated in an ion exchanger stage first with an aqueous ammonium carbonate solution, then with an aqueous lanthanum nitrate solution. Thereafter, treated zeolite and mother liquor are separated by a suitable process, for example filtration, and optionally dried. The zeolite thus pretreated is calcined in a furnace, releasing ammonia. These stages can be conducted twice or more in succession. The mother liquor from the removal stage is supplied to a column which comprises a stripping section and is heated at the bottom with an evaporator or by direct addition of steam. The temperature increase drives out ammonia and carbon dioxide, entraining water in the form of steam. The vaporous mixture is condensed in a direct or indirect condenser, and ammonia and carbon dioxide recombine with water to give aqueous ammonium carbonate. The ammonium carbonate solution thus obtained is recycled into the ion exchange stage. Via the bottom of the column, an aqueous sodium carbonate solution is discharged. The ammonia from the calcining furnace is optionally conducted with supplementary ammonia and carbon dioxide into the column upstream of the condenser.

EXAMPLES

The invention is illustrated in detail by the examples and comparative examples which follow, but without being restricted thereto.

The contents of rare earth metal, expressed as the oxide (REO), were determined with the aid of X-ray fluorescence (XRF) analysis. For this purpose, the following procedure was employed: 4 g of the zeolite sample were calcined at 1500° F. (815.56° C.) for 15 minutes and ground by grinding for two minutes, then SOMAR Microcellulose Binder was added and the mixture was ground for a further two minutes. The ground material was used to produce a slug by means of a hydraulic press. The slug was analyzed with a Panalytical XRF. This determined the contents of sodium and rare earth metal. For this purpose, it was necessary to calibrate the Panalytical XRF beforehand with the elements to be analyzed. In doing this, the matrix had to be taken into account. The calibrations were performed with standard samples with known contents of sodium and rare earth metals. The results could be read off directly from the instrument. The result for rare earth metals was expressed in REO and the total content of the rare earth metals in the zeolite was reported in "% by weight (expressed as REO)".

Example 1

500 g of ammonium carbonate (Fisher Chemicals/Fisher Scientific) with a purity of greater than 99% in lumps were dissolved in 2 kg of distilled water by vigorous stirring at room temperature. The resulting 20% ammonium carbonate solution was used in the subsequent experiment.

200 g of zeolite (BASF product number 6505-2), the sodium content of which had been reduced by a first ion exchange with ammonium nitrate and subsequent calcination at 500° C. in the industrial plant, were initially charged in a beaker at room temperature. The sample was admixed with 400 g of ammonium carbonate solution, heated to 60° C. and stirred for 15 minutes. Thereafter, the suspension was filtered. The filtrate was analyzed. The filtercake was washed 4 times with 100 ml each time of distilled water. A sample of 30 g of filtercake was removed and analyzed. The rest of the filtercake was admixed again with 400 g of fresh ammonium carbonate solution and resuspended in a beaker. This was repeated 4 times.

The table which follows shows the sodium values measured in percent by weight in the filtrates and in the zeolite samples, and the content of rare earth metal, expressed as oxide (REO). The zeolite samples were calcined at 1000° C. prior to the analysis.

|  | Filtrate Na (% by wt.) | Filtercake $Na_2O$ (% by wt.) | Filtercake Total REO (% by wt.) |
|---|---|---|---|
| Original sample | ./. | 2.7958 | 3.6219 |
| 1st ion exchange | 0.35 | 1.7214 | 3.6179 |
| 2nd ion exchange | 0.14 | 1.2346 | 3.6388 |
| 3rd ion exchange | 0.06 | 1.0223 | 3.6722 |
| 4th ion exchange | 0.03 | 0.8808 | 3.6369 |

Comparative Example C1

410 g of ammonium nitrate were dissolved in 2 kg of distilled water by vigorous stirring at room temperature. The resulting 17% ammonium nitrate solution was used in the subsequent experiment.

200 g of zeolite (BASF product number 6505-2), the sodium content of which had been reduced by a first ion exchange with ammonium nitrate and subsequent calcination at 500° C. in the industrial plant, were initially charged in a beaker at room temperature. The sample was admixed with 400 g of ammonium nitrate solution, heated to 60° C. and stirred for 15 minutes. Thereafter, the suspension was filtered. The filtrate was analyzed. The filtercake was washed 4 times with 100 ml each time of distilled water. A sample of 30 g of filtercake was removed and analyzed. The rest of the filtercake was admixed again with 400 g of fresh ammonium carbonate solution and resuspended in a beaker. This was repeated 4 times.

The table which follows shows the sodium values measured in percent by weight in the filtrates and in the zeolite samples, and the content of rare earth metal, expressed as oxide (REO). The zeolite samples were calcined at 1000° C. prior to the analysis.

|  | Filtrate Na (% by wt.) | Filtercake $Na_2O$ (% by wt.) | Filtercake Total REO (% by wt.) |
| --- | --- | --- | --- |
| Original sample | ./. | 2.7958 | 3.6219 |
| 1st ion exchange | 0.35 | 1.1591 | 3.5754 |
| 2nd ion exchange | 0.14 | 0.7970 | 3.5400 |
| 3rd ion exchange | 0.06 | 0.6557 | 3.5051 |
| 4th ion exchange | 0.03 | 0.5552 | 3.4658 |

Unlike the case of ion exchange with ammonium carbonate, the rare earth metal content in the zeolite was reduced in this case.

The invention claimed is:

1. A method for exchanging sodium ions in zeolites comprising sodium ions and rare earth metal ions for ammonium ions, the method comprising treating the zeolite comprising sodium ions and rare earth metal ions with a solution comprising water and ammonium carbonate, wherein after treatment, the zeolite has a content of rare earth metal of 0.01 to 10% by weight, based on rare earth metal oxide (REO), and wherein the rare earth metal content of the zeolite is virtually unchanged before and after treating the zeolite with the solution.

2. The method of claim 1, wherein the content of rare earth metal is 0.1 to 8% by weight.

3. The method of claim 2, wherein the content of rare earth metal is 0.5 to 5% by weight.

4. The method of claim 1, wherein the zeolite comprises ZSM-5 X, Y, A, L, faujasite, chabazite, erionite, mordenite, or offretite.

5. The method of claim 1, wherein the solution comprising water and ammonium carbonate is prepared from water, ammonium carbonate and a further compound selected from the group consisting of urea, ammonium carbamate, mixtures of carbon dioxide and ammonia, and mixtures thereof.

6. The method of claim 1, wherein the rare earth metal comprises an element selected from the group consisting of lanthanum, cerium, praseodymium and neodymium, and combinations thereof.

7. The method of claim 1, wherein the treatment of the zeolite takes place at a temperature of about 0° C. to about 200° C.

8. The method of claim 7, wherein the temperature is about 50 to about 80° C.

9. The method of claim 1, wherein treating the zeolite comprises suspending the zeolite in the solution comprising water and ammonium carbonate and stirring the solution.

10. The method of claim 1, wherein treating the zeolite comprises arranging the zeolite in a fixed bed form and pumping or trickling the solution comprising water and ammonium carbonate over the zeolite.

11. The method of claim 1, wherein treatment of the zeolite occurs for about 0.1 seconds to about 10 hours.

12. The method of claim 11, wherein treatment of the zeolite occurs for about 1 second to about 1 hour.

13. The method of claim 1, further comprising washing the zeolite after treating the zeolite with water, wherein the zeolite is washed with about 1 to about 1000 g water per gram of zeolite.

14. The method of claim 1, wherein treating the zeolite provides a mother liquor comprising sodium compounds, ammonium compounds and salts of rare earth metals.

15. The method of claim 14, further comprising separating the zeolite from the mother liquor.

16. The method of claim 15, wherein the mother liquor is combined with the solution comprising water and ammonium carbonate and the method is repeated.

17. The method of claim 1, further comprising calcining the zeolite after treatment to release ammonia.

* * * * *